United States Patent Office 3,546,167
Patented Dec. 8, 1970

3,546,167
POLYXANTHONES
Roland Darms, Fairfax, Wilmington, Del., assignor to E. I. du Pont de Nemours and Company, Wilmington, Del., a corporation of Delaware
No Drawing. Filed Nov. 1, 1967, Ser. No. 679,643
Int. Cl. C08g 15/00, 17/04
U.S. Cl. 260—47                                                7 Claims

ABSTRACT OF THE DISCLOSURE

Polyxanthones, new polymers having at least one

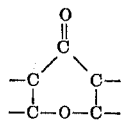

ring in each repeating unit prepared by ring closure of certain polyketones, and useful in high temperature applications and as electrical insulation.

BACKGROUND

Xanthone ring systems (I) and "dixanthone" ring systems (II and III)

(I) 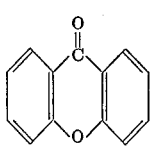

(II) 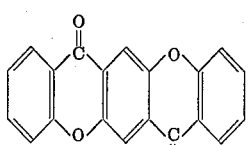

(III) 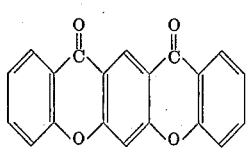

have heretofore been known only in monomeric compounds. Xanthone (I) has been prepared by a wide variety of synthetic methods as reported in Beilstein's Handbuch 17, 354, I 190, II 378. These methods include (a) treatment of 2-phenoxybenzoic acid with concentrated sulphuric acid, phosphorus pentachloride or other cyclizing agent, and (b) treatment of 2,2′-dihydroxybenzophenone with concentrated sulphuric acid. Although no reference could be found in the literature to synthesis of xanthone by dehydrohalogenation of 2-halo-2′-hydroxybenzophenone, this type of synthesis is known for a number of substtiuted xanthones, including 2-methylxanthone.

Various "dixanthone" structures have been reported in the literature. For example, 7,14-diketo-5,12-dioxa-5,7,12, 14-tetrahydropentacene (II) has been prepared by treatment of 2,5-diphenoxyterephthaloyl chloride with aluminum chloride, as reported by Eckert and Seidel, J. pr. chem. [2] 102,360 (1921). Similarly, 12,14 - diketo-5,7- dioxa-5,7,12,14 - tetrahydropentacene (III) was prepared by treatment of 4,6-diphenoxyisophthalic acid with thionyl chlroide, also by Eckert and Seidel.

The present invention concerns polymers containing these xanthone ring systems.

SUMMARY OF INVENTION

This invention provides a new and useful class of polymers, specifically, polyxanthones having as a recurring unit the structure

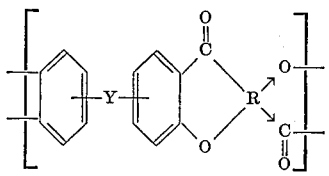
(IV)

where Y is a covalent bond or oxygen atom, R is a tetravalent carbocyclic aromatic radical, the arrows denote isomerism, and the two R—CO bonds are in any configuration except ortho to one another and each R—O is ortho to one, and only one, R—CO bond. These new polymers are solids and contain a sufficient number of recurring units to provide an inherent viscosity, e.g. over about 0.10, to make them film forming. The invention also provides a method of making the polymers that includes ring closure of certain polyketones.

These polyxanthones are resistant to attack by most solvents and chemicals, and possess good physical and electrical properties at high temperature. Thus they are useful as electrical insulating material in various forms such as film, fiber, tube, rods, and the like.

In accordance with the present discovery, the new polyxanthone polymers can be made from diphenols and dihalogenated aromatic dicarboxylic acids or acid halides, the acid component having certain necessary structural characteristics given hereinafter, in a two step synthesis. Suitable diphenols which can be used have the following structural formula (V) 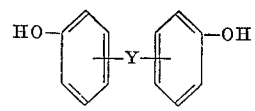

where Y is a covalent bond or an oxygen atoms. Illustrative examples of such diphenols are: 4,4′-dihydroxybiphenyl, 3,3′-dihydroxybiphenyl, 2,2′-dihydroxybiphenyl, 3,4′-dihydroxybiphenyl, 4,4′-dihydroxydiphenyl ether, 3, 3′-dihydroxydiphenyl ether, 2,2′-dihydroxydiphenyl ether, 3,4′-dihydroxydiphenyl ether, and 2,4′-dihydroxydiphenyl ether.

Suitable dihalogenated aromatic dicarboxylic acids and acid halides which can be used have the following structural formula:

(VI) 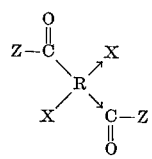

where R is

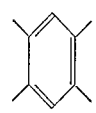

or

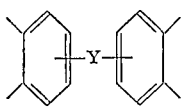

Y is a covalent bond or oxygen atom; X is Cl or Br; Z is OH, Cl or Br; the arrows denote isomerism; the two bonds between R and CO are any configuration except ortho to one another, and each bond between R and X is ortho to one, and only one, bond between R and CO. Illustrative examples of such compounds useful in the process of this invention either as the carboxylic acids or as the corresponding acid chlorides or acid bromides are:
2,5-dichloroterephthalic acid,
2,5-dibromoterephthalic acid,
4,6-dichloroisophthalic acid,
4,6-dibromoisophthalic acid,
3,3'-dichlorodiphenyl-4,4'-dicarboxylic acid,
4,4'-dichlorodiphenyl-3,3'-dicarboxylic acid,
3,3'-dibromodiphenyl-4,4'-dicarboxylic acid, and
3,3'-dichloro-4,4'-dicarboxydiphenyl ether.

Briefly, the process of the invention involves two steps: (1) reaction of a diphenol with a dihalogenated aromatic dicarboxylic acid or acid halide under Friedel-Crafts conditions to form a polyketone VII carrying two phenolic hydroxyl groups and two halogen atoms in each repeating unit:

(VII)

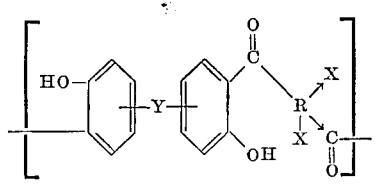

where Y, R and X are as hereinbefore defined, and (2) treatment of the product of the first step with a strong base to remove from each repeating unit the elements of two molecules of hydrogen halide to form xanthone ring systems.

The first step of the synthesis, in which there is formed the polyketone (VII), is a Friedel-Crafts polycondensation reaction carried out preferably in the presence of hydrogen fluoride and boron trifluoride. The amount of catalyst employed can vary widely but ordinarily is an amount of at least a molar equivalent, and preferably at least 2 or 3 moles to 15 or 20 moles, of boron fluoride per carbonyl in the acid or acid halide reactant used.

Preferably about 2 to about 10 moles of hydrogen fluoride for each mole of boron fluoride issued. The hydrogen fluoride serves both in a catalytic capacity and as a solvent and therefore the amount of excess can be greater than 10 moles, say, 20 or 30 moles, per mole of boron fluoride without interfering with the reaction. The reaction forming the polyketone proceeds within a fairly broad temperature range, ranging from as low as only a few degrees above the freezing temperature of the reactants to as high as 100° or 150° C.

The polyketone can be produced in reaction times as low as 15 or 20 minutes or less and as high as 10 or 20 hours or more, at autogeneous pressure, or at higher pressures. The polyketone resulting can be isolated, recovered and, if desired, purified according to conventional techniques. For example, the resulting mass can be dissolved in a suitable solvent, filtered to remove undissolved impurities, and precipitated in a suitable non-solvent.

The second step of the process of producing the new polyxanthones is carried out by treatment of the polyketone intermediate VII with a strong base, for example, 2 or more moles of base per mole of polyketone. Examples of suitable strong bases are sodium hydroxide and potassium hydroxide. It should be understood that complete cyclization to xanthone units generally does not occur, and that up to about 20% of the functional linkages of the polymer may remain as ketone as in Formula VII. It is intended that the term "polyxanthone" for the purpose of this invention be interpreted to mean those polymers which contain a predominant number of xanthone units, with up to about 20% of the linkages remaining in the uncyclized form as shown in Formula VII.

The preferred reaction medium for the second step (dehydrohalogenation with strong base) is dimethyl sulfoxide. Other media, such as di-n-propyl sulfoxide, tetramethylene sulfoxide, methanol and ethanol may also be employed. However, both the extent and rate of xanthone ring formation are greater in the preferred medium.

The reaction suitably is carried out at an elevated temperature in an inert atmosphere, e.g. nitrogen. The recovered product is worked up or purified by conventional techniques.

Polyxanthones possess excellent thermal stability and chemical resistance. The polymers are yellow in color. Shaped articles such as films and filaments can be formed by casting or spinning a hydrogen fluoride solution of the polymer.

The invention will be described further in conjunction with the following example, which is given by way of illustration and not by way of limitation.

Inherent viscosity is measured at 30° C. at a concentration of 0.5% by weight of the polymer in a suitable solvent, e.g., concentrated sulfuric acid. To calculate inherent viscosity, the viscosity of the polymer solution is measured relative to that of the solvent alone.

Inherent viscosity $$= \frac{\text{natural logarithm } \frac{\text{Viscosity of solution}}{\text{Viscosity of solvent}}}{C}$$

where C is the concentration expressed in grams of polymer per 100 milliliters of solution. As known in the polymer art, inherent viscosity is directly related to the molecular weight of the polymer.

EXAMPLE

A 150 ml. stainless steel pressure vessel was charged with 4.65 g. (0.025 mole) of 4,4'-dihydroxybiphenyl and 5.88 g. (0.025 mole) of 2,5-dichloroterephthalic acid. The vessel was closed, cooled to below −60° C. by placing in a bath of acetone and solidified carbon dioxide (Dry Ice), and placed under vacuum in order to remove air from the vessel. Then 20 g. (1.0 mole) of hydrogen fluoride was condensed into the vessel through stainless steel tubing from a supply cylinder, following which 34 g. (0.5 mole) of boron trifluoride was similarly transferred into the reaction vessel. The vessel was placed on a rocker apparatus, and was heated to 50° C. for 2 hours and to 75° C. for 2 hours. The vessel was permitted to cool to room temperature, then vented in order to permit volatile materials to escape, and the reaction mixture was discharged into a saturated aqueous sodium acetate solution. The precipitated solid was collected by filtration, and washed consecutively with water, 5% aqueous sodium bicarbonate solution, water, then refluxed for 30 minutes in water, collected by filtration and dried under vacuum. This product was the polyketone corresponding to Formula VII. The polymer had an inherent viscosity of 0.49 as measured on a 0.5% by weight solution in sym-dichlorotetrafluoroacetone hydrate at 30° C.

To 2.3 g. (6 millimoles) of granular polyketone from the previous paragraph was added 35 ml. of dimethylsulfoxide, 5 ml. of benzene and a solution of 0.77 g. (12 millimoles) of potassium hydroxide (87% KOH pellets) in 5 ml. of water. The reaction mixture was heated under reflux with stirring, under an atmosphere of nitrogen, and the water was continuously removed from the reaction mixture by means of a Dean-Stark moisture trap which was filled with benzene. After heating under reflux for 16 hours the heterogeneous reaction mixture was poured into water. The precipitated polymer was collected by filtration, washed thoroughly with water, and dried under vacuum. The polymer had an inherent viscosity of 0.60 as measured on a 0.5% by weight solution in concentrated sulphuric acid at 30° C. The infrared spectrum of the polymer and its chlorine analysis showed that more than 90% of the functional linkages of the polymer had cyclized to xanthone rings of the type shown in Formula IV.

A solution of 0.6 g. of the polyxanthone in 20 g. of hydrogen fluoride was prepared and cast onto a stainless steel plate. After evaporation of the solvent a yellow, self-supporting, clear film of the polymer was obtained. The polymer was insoluble in N,N-dimethylformamide and N,N-dimethylacetamide. Thermogravietric analysis in nitrogen of this polymer showed weight losses of 4% at 350° C., 9% at 550° C., and 29% at 700° C.

In another run similar to that just given, the polyxanthone had an inherent viscosity of 0.52 (0.5% in concentrated $H_2SO_4$ at 30° C.) and about 88% of the linkages were cyclized to xanthone units.

From the foregoing discussion, description and data, it is evident that the present invention provides important new polymers, polyxanthones.

What is claimed is:
1. A film and fiber forming polyxanthone polymer consisting essentially of the recurring unit

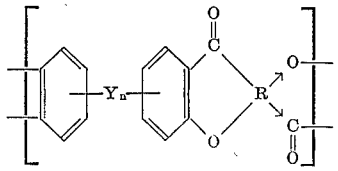

where Y is an oxygen atom, $n$ is 0 or 1, R is a tetravalent carbocyclic aromatic radical, the two R—CO bonds are other than ortho to one another, each R—O bond is ortho to a single R—CO bond, and the arrows denote isomerism.

2. A polyxanthone according to claim 1 in which R is of the group

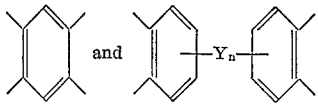

where y is an oxygen atom.

3. A film and fiber forming polyxanthone consisting essentially of the recurring unit

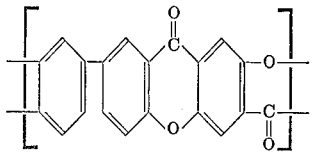

4. A polyxanthone according to claim 3 in the form of a self-supporting film.

5. A method for producing a film and fiber forming polyxanthone comprising dehydrohalogenating a polyketone of the recurring unit

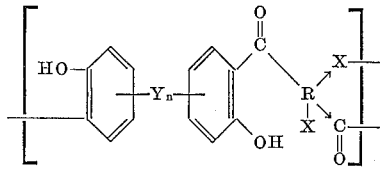

where Y is an oxygen atom, $n$ is 0 or 1, R is a tetravalent carbocyclic aromatic radical, the two R—CO bonds are other than ortho to one another, each R—X bond is ortho to a single R—CO bond, X is chlorine or bromine and the arrows denote isomerism.

6. A method according to claim 5 in which said polyketone is heated with a base to remove hydrogen halide therefrom.

7. A method according to claim 6 in which said base is potassium hydroxide.

References Cited
UNITED STATES PATENTS 3,324,199 6/1967 Tocker _____ 260—47C
3,385,825 5/1968 Goodman et al. _____ 260—61
3,398,120 8/1968 Hindersinn et al. ____ 260—47C WILLIAM H. SHORT, Primary Examiner L. M. PHYNES, Assistant Examiner U.S. Cl. X.R.

117—128.4; 260—29.1, 30.8, 45.7, 61, 63, 78.4